June 30, 1942.  W. A. JOHNS  2,287,937
GEAR SHIFTING APPARATUS
Filed May 19, 1939  12 Sheets-Sheet 1

Inventor:
Winthrop A. Johns,
By Potter, Pierce & Scheffler,
Attorneys.

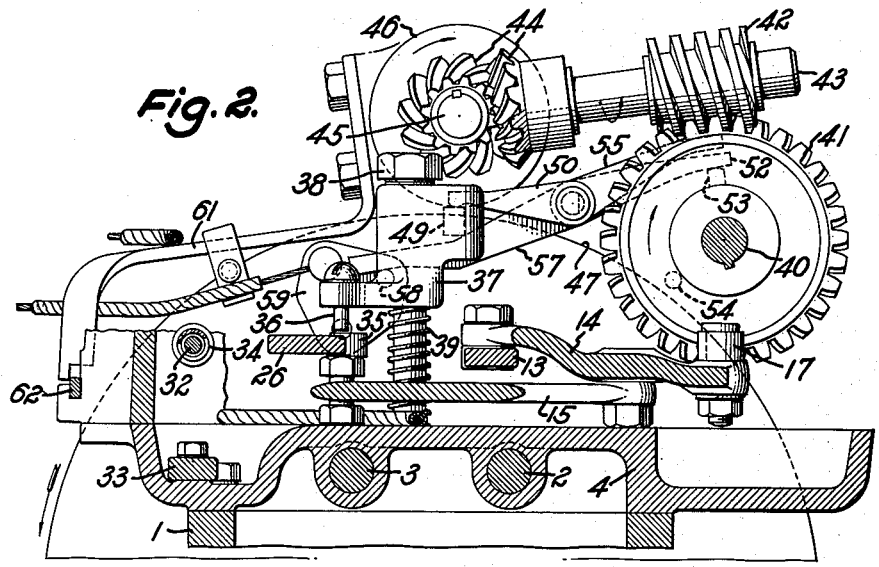
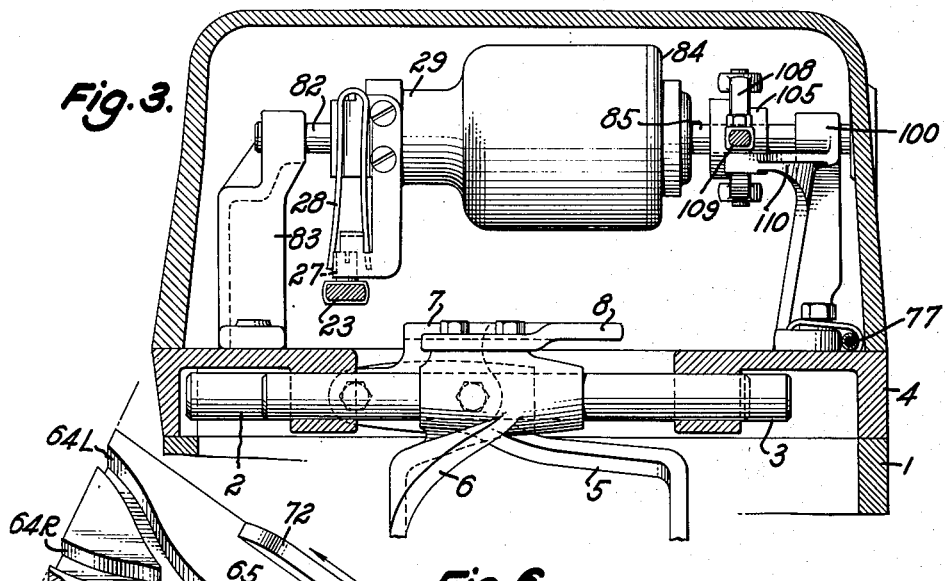
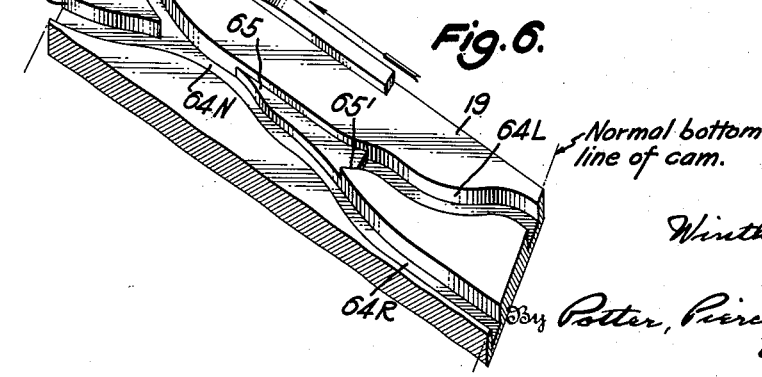

In normal Low

In Low set for Second

In normal Second

In Second set for High

In High set for Second

Reverse

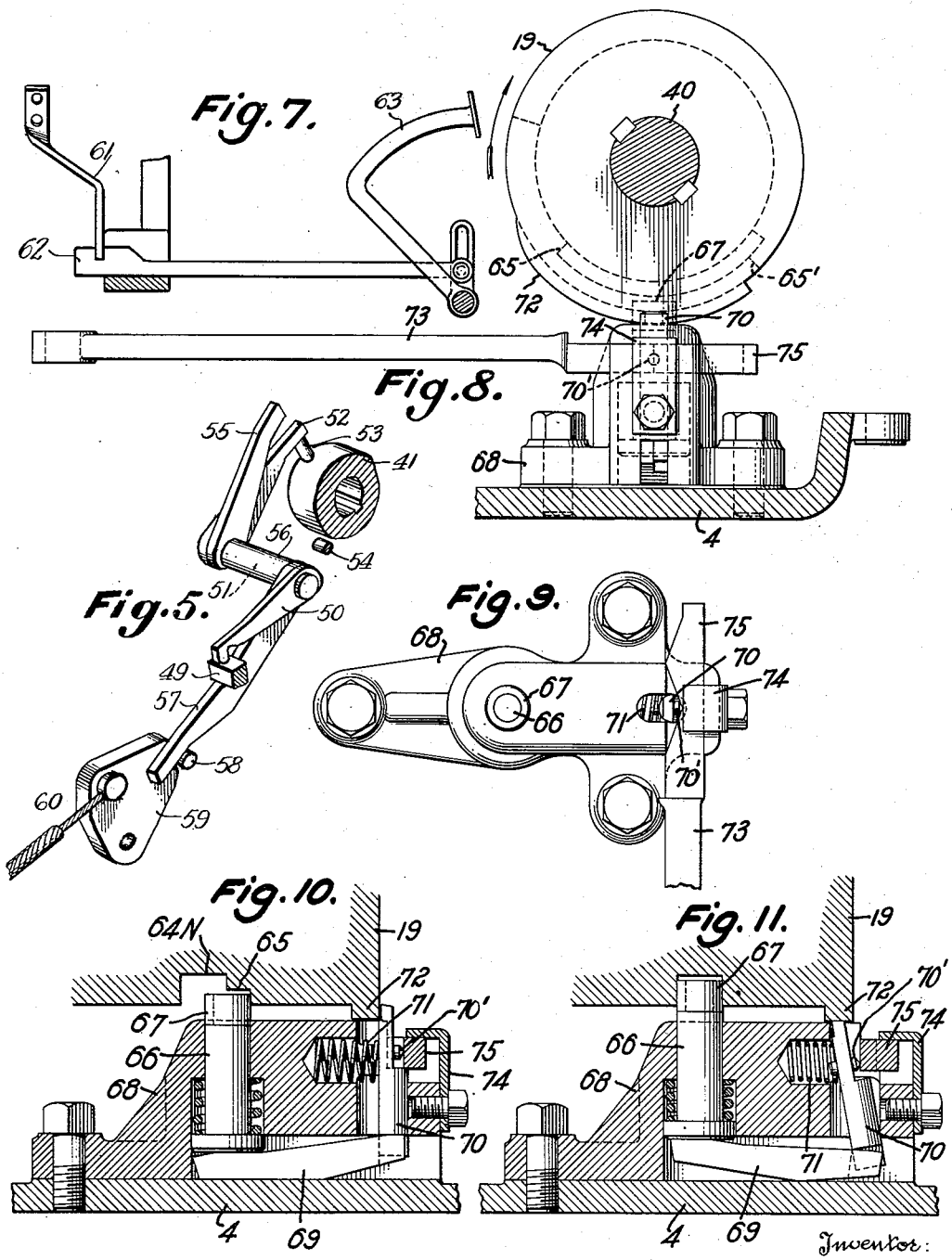

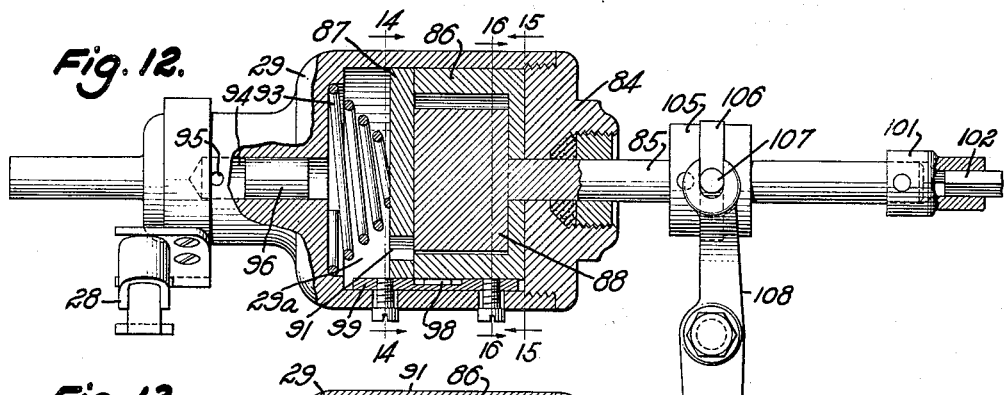
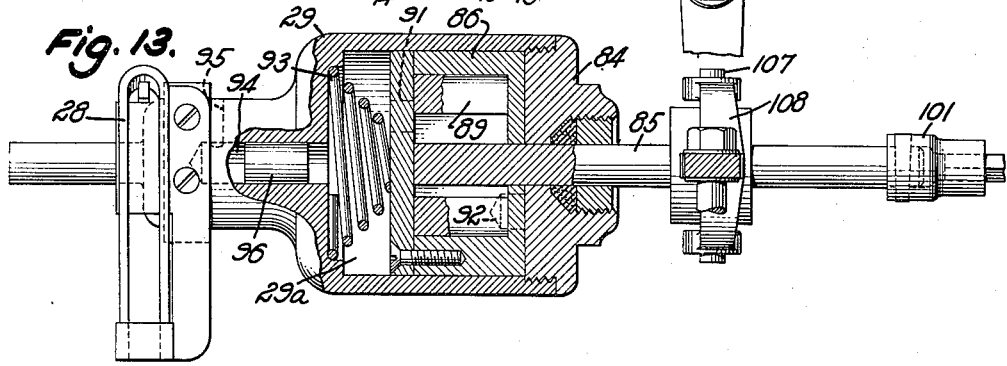
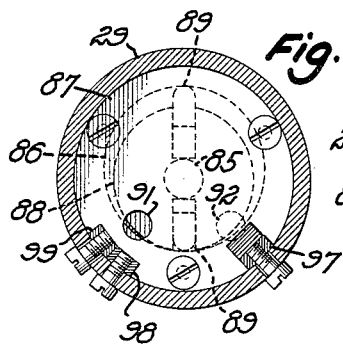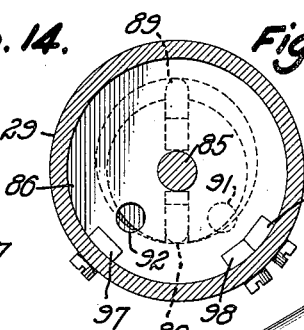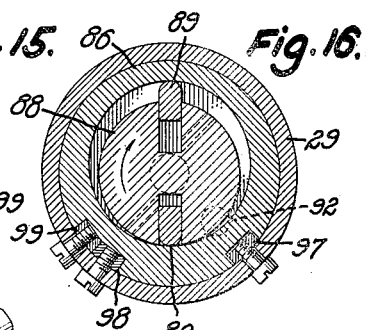
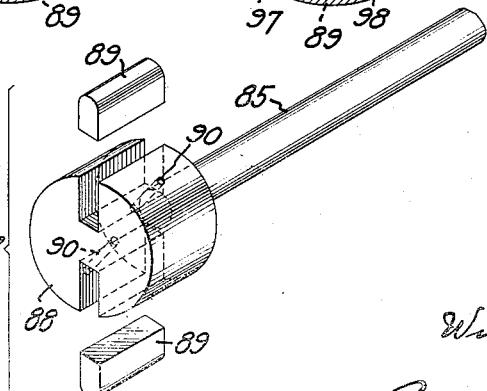

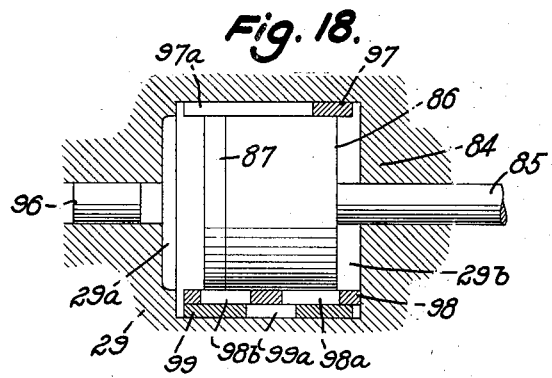
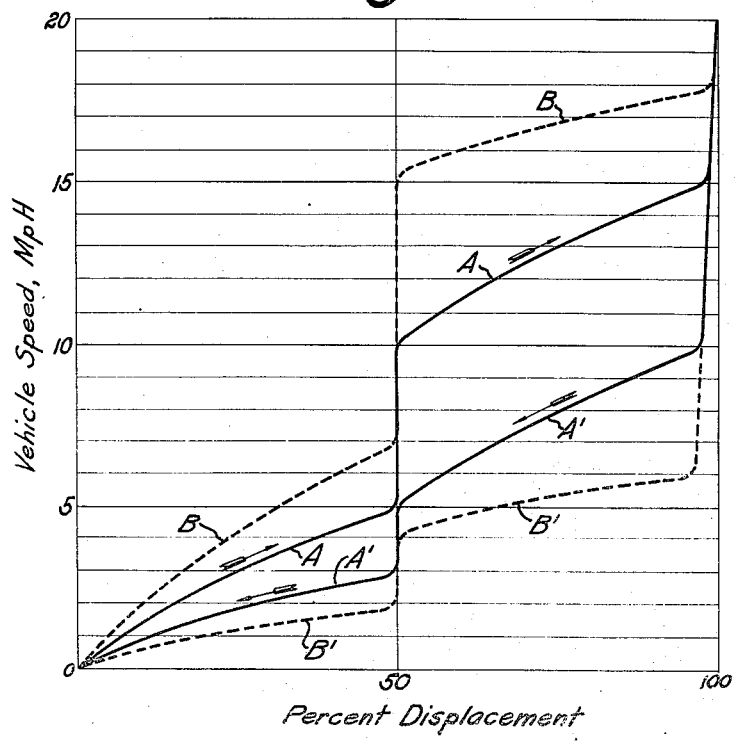

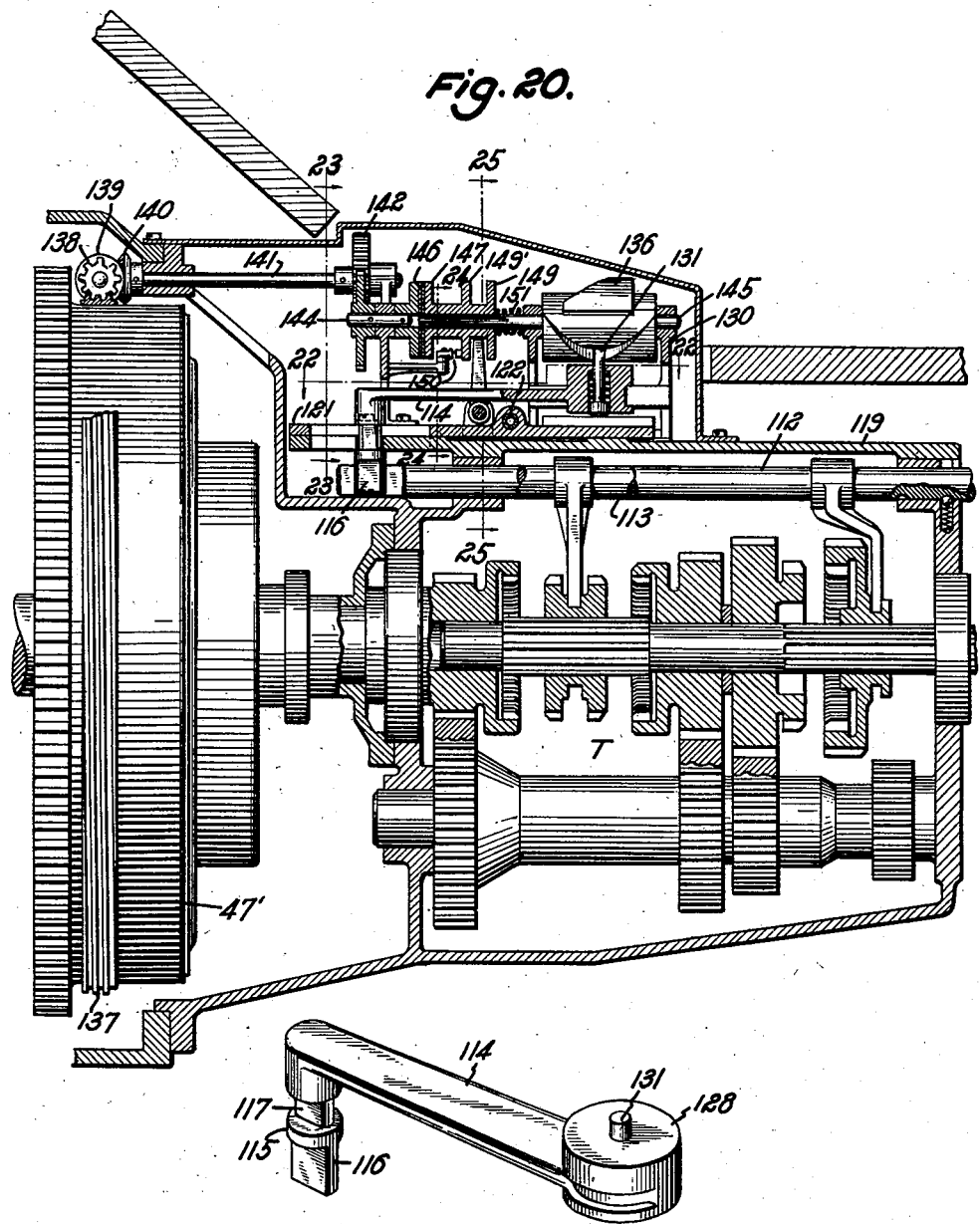

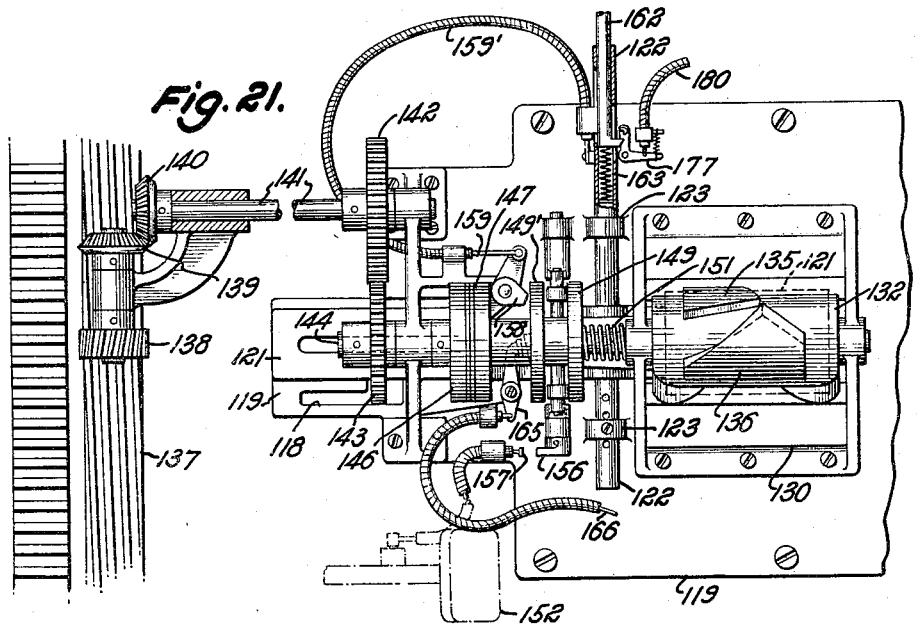

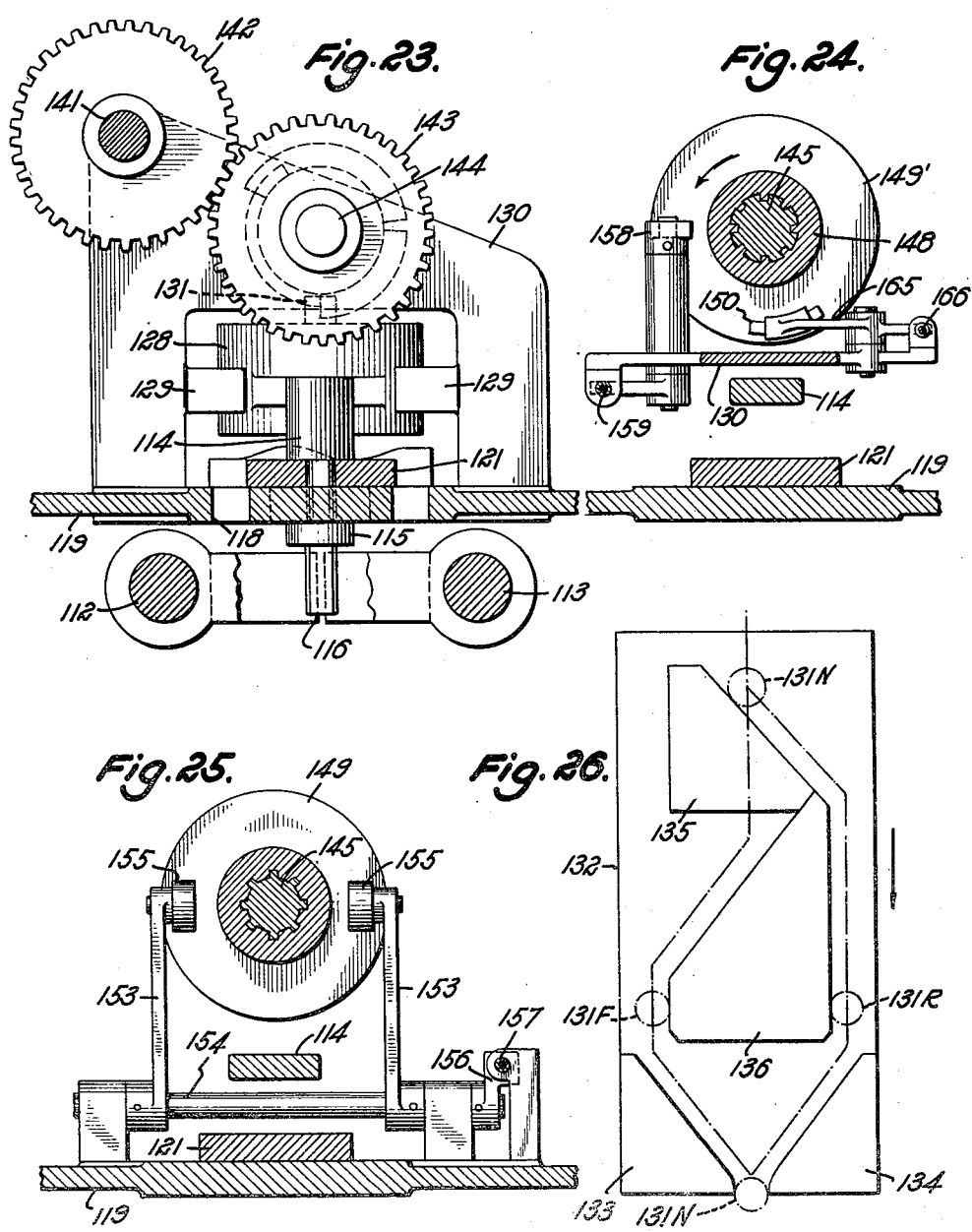
June 30, 1942. W. A. JOHNS 2,287,937
GEAR SHIFTING APPARATUS
Filed May 19, 1939 12 Sheets-Sheet 9

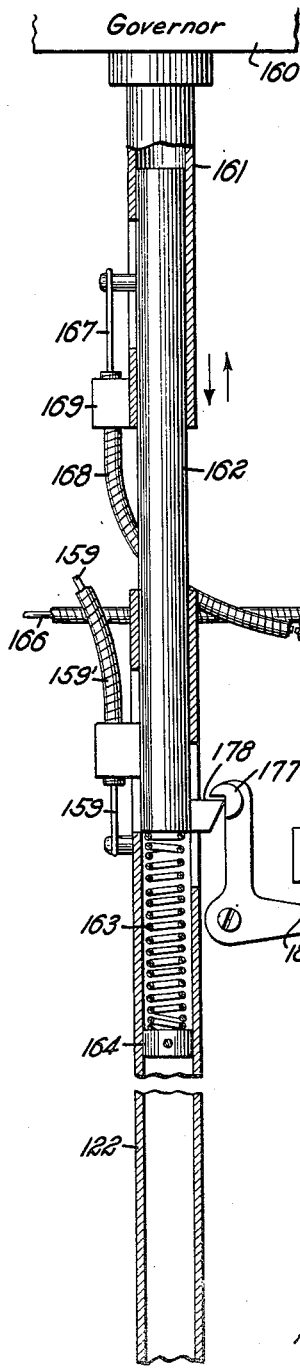

June 30, 1942.  W. A. JOHNS  2,287,937
GEAR SHIFTING APPARATUS
Filed May 19, 1939  12 Sheets-Sheet 11

Inventor:
Winthrop A. Johns,
By Potter, Pierce & Scheffler,
Attorneys.

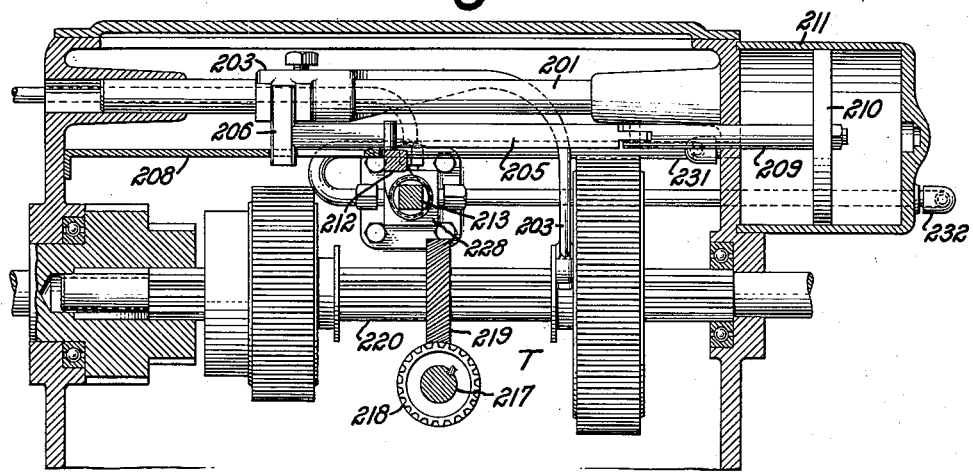
Fig. 35.
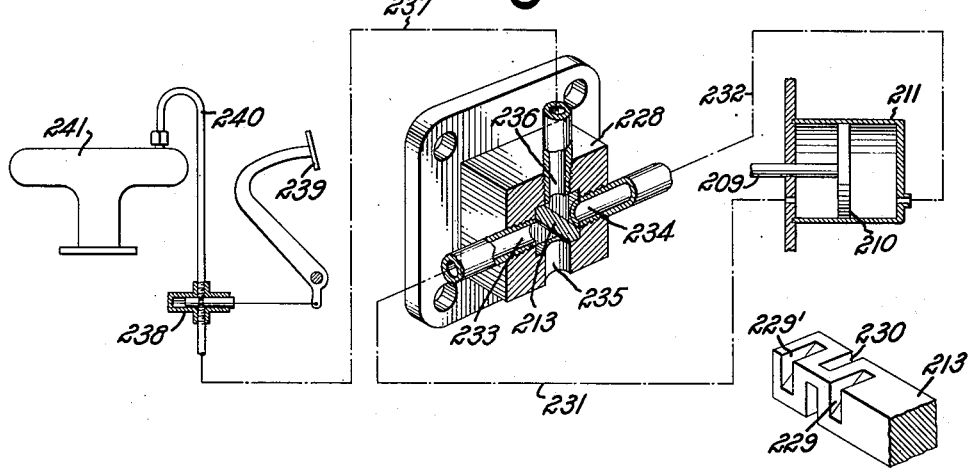
Fig. 37.
Fig. 36.

Patented June 30, 1942

2,287,937

UNITED STATES PATENT OFFICE 2,287,937

GEAR SHIFTING APPARATUS

Winthrop A. Johns, New Brunswick, N. J., assignor to Research Corporation, New York, N. Y., a corporation of New York Application May 19, 1939, Serial No. 274,634

18 Claims. (Cl. 74—336.5)

This invention relates to gear shifting apparatus and particularly to apparatus for use with transmission gears such as are employed on motor vehicles and the like.

This application is a continuation-in-part of my copending application Ser. No. 740,761, filed Aug. 21, 1934, "Automatic gear shift mechanisms for motor vehicles and the like."

An object of this invention is to provide gear shifting apparatus including a governor responsive to the speed of the vehicle for determining the gears that are to be engaged, and power mechanisms operable upon the release of the clutch for shifting the gears. An object is to provide a semi-automatic gear shifting apparatus that may be associated with a conventional automobile transmission gear of the "H-slot" type, the apparatus including a governor responsive to vehicle speed to select the shift that is to be made, power mechanism for effecting the shift, and a latch actuated upon a release of the vehicle clutch to place the power mechanism in operation to make the shift. A further object is to provide semi-automatic gear shifting mechanism of the type stated which includes manually operated mechanism for controlling the critical vehicle speeds at which the governor selects the several transmission gears for engagement. Another object is to provide a semi-automatic gear shifting mechanism for use with the multispeed transmission gear of a vehicle, the mechanism including a governor responsive to the vehicle speed for selecting the gears that are to be engaged, a cam for shifting the gears, a drive system for operating the cam from the flywheel, and a latch operable by the vehicle clutch to render the drive system inoperative to actuate the cam. A further object is to provide a semi-automatic gear shifting apparatus including a governor for selecting the gears for engagement in accordance with the vehicle speed, a power mechanism for effecting the shift, and manually controlled devices to condition the apparatus for actuation by the power mechanism into "neutral" or reverse drive.

Further objects are to provide semi-automatic gear shifting apparatus including a governor responsive to the vehicle speed for selecting the gear that is to be engaged, the governor having a relatively fixed base and a part movable from the base as a function of the vehicle speed, and manually operable devices for altering the position of the relatively fixed base to control the critical vehicle speeds at which the governor sets the apparatus for engagement of the several gear combinations. A further object is to provide a novel form of barrel cam having a follower engaged in a groove path in the cylindrical surface of the cam, the groove path having diverging branches of different diameters for shifting the follower in different manners in accordance with the position of the follower with respect to the axis of the cam.

These and other objects and advantages of the invention will be apparent from the following specification when taken with the accompanying drawings in which:

Fig. 2 is a fragmentary transverse section taken substantially on line 2—2 of Fig. 1;

Fig. 3 is a fragmentary longitudinal section, with parts of the linkages omitted for the clearer illustration of the governor and the shifting rods of the transmission gear;

Fig. 5 is a perspective view of the devices for arresting the drive of the cam that shifts the gears;

Fig. 6 is a fragmentary perspective view of a development of the cylindrical cam;

Fig. 7 is a fragmentary side elevation of the clutch operated latching member;

Fig. 8 is a fragmentary end elevation of the cam, the follower and its adjusting plate;

Fig. 9 is a plan view of the cam follower and its housing;

Figs. 10 and 11 are fragmentary sectional views of the cam follower and cam;

Figs. 12 and 13 are fragmentary plan and side elevations of the hydraulic governor, with parts shown in section;

Figure 33:
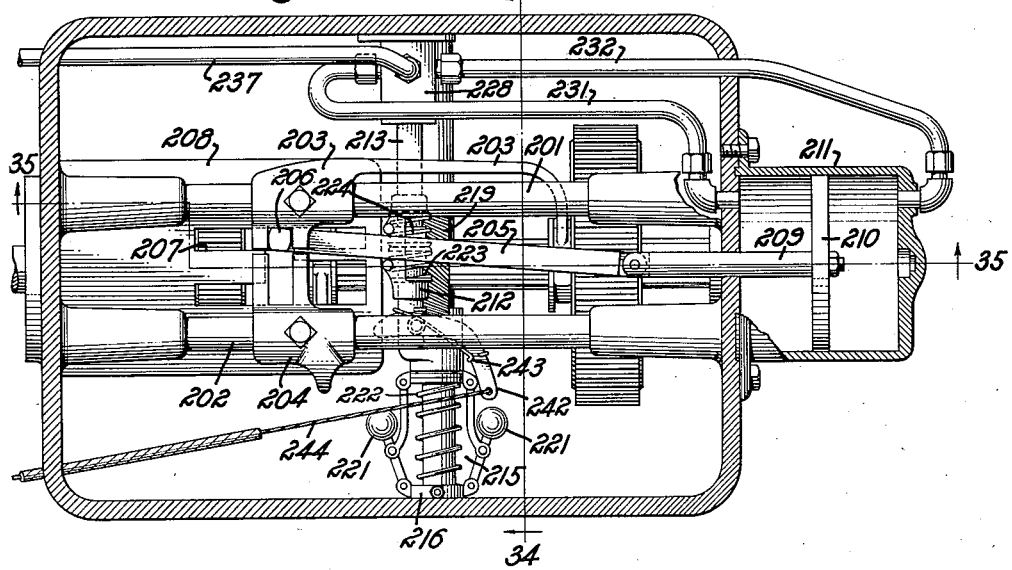
Figure 34:
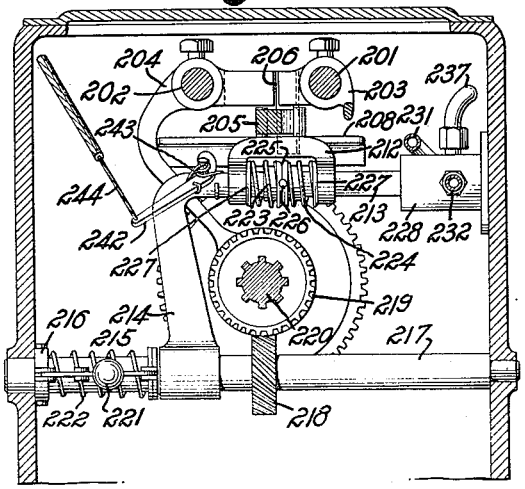

Figs. 14, 15 and 16 are transverse sections through the governor on lines 14—14, 15—15 and 16—16, respectively, of Fig. 12;

Fig. 17 is an exploded perspective view of the pump mechanism of the governor;

Fig. 18 is a schematic view of the ports which connect the opposite sides of the governor casing;

Fig. 19 is a curve sheet showing the relationship of vehicle speed to governor casing displacement;

Fig. 20 is a longitudinal sectional view through a conventional transmission provided with another embodiment of the invention;

Fig. 21 is a fragmentary plan view of the gear shifting mechanism of Fig. 20, on a larger scale and with the cover and other parts omitted;

Fig. 22 is a detail horizontal section, on an enlarged scale, substantially on line 22—22 of Fig. 20;

Figs. 23, 24 and 25 are transverse sectional views on an enlarged scale taken on lines 23—23, 24—24 and 25—25, respectively, of Fig. 20;

Fig. 26 is a diagrammatic development of the barrel cam;

Figs. 27 and 28 are perspective views of the shifting lever and the sliding plate, respectively;

Fig. 29 is a fragmentary sectional view of the governor-actuated and the manual controls, the view continuing on an enlarged scale the upper part of Fig. 21;

Figs. 30 and 31 are transverse sections on lines 30—30 and 31—31, respectively, of Fig. 29;

Fig. 32 is a perspective view of the handle member shown in Fig. 29;

Fig. 33 is a plan view of another form of gear shifting mechanism, the cover of the gear box being omitted and some parts shown in section;

Fig. 34 is a fragmentary transverse section taken substantially on line 34—34 of Fig. 33;

Fig. 35 is a fragmentary vertical section substantially on line 35—35 of Fig. 33;

Fig. 36 is a fragmentary perspective view of the governor-actuated valve bar; and Fig. 37 is a schematic view, with the valves in section, of the control mechanism.

Figure 1:
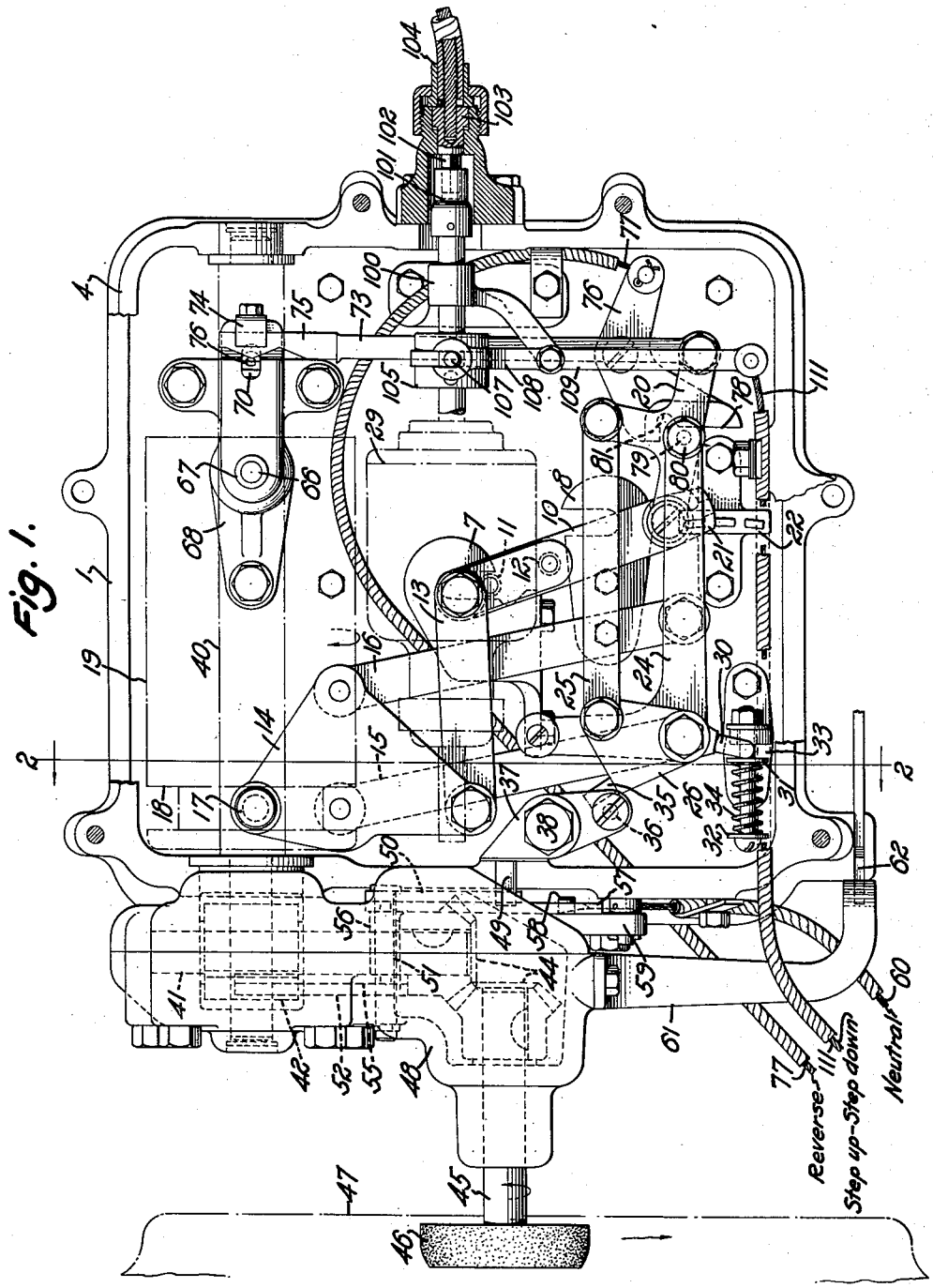
Fig. 1 is a plan view of one embodiment of the invention, the apparatus being shown with the cover removed, and with the governor and cam indicated in broken line.

In Figs. 1–3 of the drawings, the reference numeral 1 identifies the gear box of a conventional automobile transmission having one "reverse" and three "forward" drive gears, not shown, which are selectively engaged by the axial displacements, from central "neutral" positions, of the rails 2, 3 that are slidable in the cover plate 4 and carry stirrups 5, 6, respectively, to engage the shiftable transmission gear members. Notched plates 7, 8 are secured to the rails 2, 3, respectively, for cooperation with the gear shifting mechanism which, in prior constructions, has been a gear shift lever movable in an H-slot or its equivalent. In accordance with this invention, the gear shift lever is replaced by a motor-driven mechanism that is brought into operation when the clutch is thrown out.

A link 10 has downwardly projecting pins 11, 12 for engagement with the notches in plates 7, 8, respectively, when the link is moved transversely of the gear box, and the upper end of link 10, as seen in Fig. 1 is connected by a link 13 to a triangular plate 14 that is pivoted to the parallel links 15, 16 and carries a roller 17 that travels in a circumferential groove 18 in a cylindrical or barrel cam 19. The lower ends of the parallel links 15, 16 are pivoted on the cover plate 4 and the function of this linkage is to "multiply" the angular displacement of the link 10 for an axial displacement of the cam 19. If the link 10 were extended to and directly connected to the cam 19, the displacement of the pins 11, 12 of link 10 would be about one-half the displacement of the cam 19. The parallel linkage 15, 16 and the triangular plate 14 make the displacement of the pins 11, 12 substantially equal to the axial displacement of the cam. The construction and method of operation of this linkage can be best understood from a consideration of the schematic views, Figs. 4a to 4f, in which the gear shifting linkage is illustrated as vertically displaced from the governor-operated linkage.

The lower end of link 10 is pivoted to one arm of a T-shaped lever 20 and has a notched depending flange 21 for engagement with the rack member 22 that is fixed to the cover plate 4. The stem of the lever 20 forms one side of a parallel motion linkage that includes a bell-crank lever 23, 24 pivoted at its vertex to the plate 4, and a link 25 connecting the lever 20 to a plate 26 that is pivoted on the same axis as the bell-crank lever 23, 24.

Arm 23 carries a stud 27, Fig. 3, that extends between the depending ends of a hairpin leaf spring 28 that is secured to the movable sleeve 29 of a hydraulic speed governor. The plate member 26 has a projecting lug 30 that extends between washers 31 on a bolt 32 that is slidable in a bracket 33 mounted on plate 4 and carries a spring 34 which tends to hold the washers 31 in contact with the bracket 33. Angular movement of plate 26 in either direction compresses the spring 34 and thus establishes a stress tending to return the plate 26 to a normal position with the lug 30 overlying the bracket 33. The plate 26 also has a lug 35 that extends beneath the pin 36 of a latching member which is slidable on a bolt 38 and urged towards elevated position by a spring 39.

The governor 29, parallel motion linkage 20—25, and spring 34 constitute the mechanism for displacing the shifting link 10 transversely of the gear box to engage the pin 11 with the yoke 7 or the pin 12 with the yoke 8. The longitudinal movement of the selected yoke is effected by the cam 19 and the linkage which connects the cam follower 17 to the lever 10. The latching member 37 is a part of a control system for preventing an operation of the cam 19, and thereby a shifting of the gears, so long as the vehicle speed is appropriate for a drive through the gears which are then in mesh.

The cam 19 may be actuated from any power source but preferably is driven from the engine flywheel. The cam shaft 40 to which cam 19 is keyed for axial movement carries a gear 41 that meshes with a worm 42 on a transverse shaft 43 that is connected through bevel gears 44 to the stub shaft 45, the latter carrying a friction roller 46 for engagement with the flywheel 47. The shafts 43 and 45 are mounted in a casing 48 that is not fixed to the gear box but has a limited angular movement about the axis of the cam shaft 40 due to the meshing of the worm 42 with the gear 41. The casing 48 is omitted from Fig. 2 for the better illustration of the cam driving mechanism.

The roller 46 is normally spaced from the flywheel and the weight of the casing 48 and the enclosed gears tends to rotate the casing counter-clockwise, as seen in Fig. 2, for engagement of the friction roller with the flywheel when certain latching devices are released. The latching member 37 that is controlled by the vehicle speed has a forwardly projecting pin 49 that constitutes a stop or support for the casing 48 when the member 37 is held in elevated position by lug 35 of the plate 26. The lever arm 50 is secured to a shaft 51 that is mounted in the casing 48, and the end of the arm 50 rests on the pin 49. The lever arm 52 on the other end of the shaft 51 is positioned in the path of a pin 53 on the hub of the gear 41. The lever system is so designed that its axis, i. e. the shaft 51 is lifted when the lever 50 is supported in raised position by the pin 49 of latching member 37 and the end of lever 52 is lifted by the pin 53. The pin 53 therefore serves to rock the gear casing 48 to break the driving engagement of friction roller 46 with the flywheel. The angular position of pin 53 is such that it stops the cam 19 when the latter is in an end position corresponding to the completion of a shift to engage one of the gear combinations.

A manually controlled latch is provided for arresting the cam motion when the shifting link 10 is in neutral position. This mechanism comprises a pin 54 on gear 41, a lever arm 55 on the tubular shaft 56 that surrounds the shaft 51, and a lever arm 57 on shaft 56. The lever arm 55 lies in the plane of, but is normally above, the path of the pin 54. The tail of the lever arm 57 rests upon a pin 58 on a plate 59 that may be rocked counterclockwise by a pull cable 60 that extends to the steering column or instrument panel of the vehicle. A manual setting of the pull cable 60 for "neutral" rocks the plate 59 to lift lever arm 57, thus depressing lever arm 55 into the path of the pin 54.

A third control of the cam driving mechanism is associated with the vehicle clutch, not shown, to prevent operation of the gear shifting mechanism so long as the clutch is engaged. This control or latching mechanism comprises a strap 61 secured to the casing 48 and resting upon a cam slide 62 that is moved to the left, as seen in Figs. 1 and 7, when the clutch pedal 63 is depressed to release the clutch. This motion of the slide 62 moves the wide section thereof from beneath the strap 61 and allows the strap to drop.

Reverting to the cam 19, this member has two circumferential cam grooves 64R, 64L that merge in a groove section 64N. The cam 19 comes to rest under normal operating conditions in one of its end positions and after one complete revolution. The normal bottom line of cam 19 is indicated by a broken line in Fig. 6, and is identified by a descriptive legend. The cam 19 is stopped in this normal position by the pin 53 as it moves beneath the end of the lever 52 to lift the gear casing 48. Cam 19 may be stopped after a rotation of about 120°, with the cam groove 64N at the bottom of the cam, by manually operating cable 60 to tilt the plate 59 and thus position the lever 55 for engagement by pin 54 to lift the gear casing 48.

The groove 64L, or at least the entrance section 65 thereof, is of greater diameter than the groove 64R and the direction in which the cam moves axially is determined by the extent to which a relatively stationary pin 66 and its roller 67, Figs. 8 to 11, project into the cam groove section 64N. The splitter edge 65' at the branching grooves 64R, 64L shifts the cam 19 to the left to bring groove 64L into operation when pin 66 is in lowered posiition, and the side edge of cam section 65 brings the groove 64R into operation when the pin 66 is in raised position. These operations may be visualized as a deflecting of the pin 66 into the larger and smaller diameter grooves but the pin 66 is in fixed lateral position and it is the cam that is shifted axially by the splitter edge 65' and the side edge of section 65.

Pin 66 is vertically movable in a housing 68 that is fixed to the cover plate 4 below the axis of the cam 19. The pin 66 rests upon one end of a rocking lever 69 that is notched at its opposite end to receive the flatted or half-round end of a cylindrical member 70 that is pressed away from the pin 66 by a spring 71. The upper end of the member 70 is notched to clear or alternatively to be engaged by the section 72 of cam 19 that projects circumferentially over a limited region in axial alinement with and extending somewhat beyond the cam groove section 64N.

The member 70 is rocked angularly by the movement of the rod 73 that is slidably supported on the housing 68 by a cap strip 74 and terminates in a notched end section or plate 75 against which the pin 70' of the member 70 bears. The rod 73 is pivotally connected to the outer end of the T-lever 20 of the parallel motion linkage, and the notched plate 75 has two crests and two valleys for engagement with the pin 70' of member 70 to position the latter to be engaged by or alternatively to be cleared by the projecting section 72 of the cam 19. Member 70 is tilted to the left when a crest of the notched plate engages the pin 70', Figs. 1, 4b and 11, and the pin 66 is therefore raised when member 70 is depressed by the initial rotary movement of the cam 19. This conditions the cam 19 for a shift to the right for an engagement of the second speed or the reverse gears. Conversely, when pin 70' of member 70 engages a valley of the plate 75, the member 70 is not depressed by the cam 19, 72 and the pin 66 therefore remains in lowered position. This conditions the system for movement of the cam 19 and shift link 10 to the left for engagement of the low or the high speed gears.

Manually operated means must be provided for a power-operated shift to reverse gear, and this mechanism preferably is designed to prevent the setting of the system for a shift to reverse gear when another gear drive is operative and the vehicle is operating at a speed above that appropriate for a shift to second gear. The reverse setting mechanism comprises a bell-crank lever or plate 76 that is pivoted on the cover plate 4 and normally stands in the position shown in Fig. 1. One arm of the lever has a flexible cable 77 connected thereto for rocking the lever clockwise when reverse drive is desired. The other end of the cable extends to the steering post or instrument panel, not shown, of the vehicle. The other arm of lever 76 has a transversely disposed edge 78 closely adjacent the path of movement of a pin 79 that depends below the bolt 80 that forms the pivotal connection of members 20, 24 of the parallel motion linkage. Engagement of the surface 78 with the pin 79 prevents a clockwise motion of the lever 76 when pin 79 is in the position shown in Fig. 1 (corresponding to a drive in low gear at a speed appropriate for a shift into second gear) or in a lower position. The pin 79 is at a higher level, as viewed in Fig. 1, when the low gear is engaged and the vehicle at rest or moving slowly, as will be explained hereinafter, and a notch 81 at the upper end of surface 78 alines with this position of the pin 79. This position of the parts permits a manual adjustment of lever 76 in clockwise direction, by the flexible cable 77, to engage the notch 81 with the pin 79 to move the pin transversely of the gear box (upwardly as seen in Fig. 1). This motion of the pin 79 conditions the parallel motion linkage for a shift of the "low-reverse" rail 2 to the right, Fig. 1, to engage the reverse drive gears.

The governor mechanism that is actuated from the propeller shaft or rear axle, not shown, is preferably of a hydraulic type that can develop large forces with apparatus of small size. The governor casing 29 has a stem 82 which slidably supports the casing on a bracket 83 that is mounted on the gear case cover 4, Fig. 3, and an end cover 84 in which the rotatable governor shaft 85 is slidably supported. The shaft 85 is also rotatable in a pump casing 86, Fig. 12, that is closed by a cover plate 87 and, with the latter, forms a piston that is slidable in the governor casing 29. The shaft 85 terminates in a rotor head 88 that has diametrically opposed slots for receiving the blades 89 that are forced outwardly into engagement with the wall of the eccentric bore of the pump casing 86 by pressure fluid entering through passages 90 that extend from the base of the slots to the periphery of the rotor. An inlet port 91 is provided in the pump cover 87 and an outlet port 92 in the pump casing 86. These ports are so arranged that the pump tends to move liquid, preferably a light oil, from the left to the right end of the casing 29. A spring 93 tends to move the governor casing 29 towards the left, Figs. 12 and 13, thus confining the oil to the space 29a within casing 29 at the left of the pump casing 86. Casing 29 has a counterbore 94 that has a vent opening 95 to atmosphere and slidably receives a breather plug 96. Temperature changes that vary the volume of the oil within casing 29 are relieved by the sliding of the plug 96 within the bore 94 and the pressure at the inlet side of the pump is substantially atmospheric. A plurality of ported strips or keys 97, 98, 99 are secured to and project inwardly from the governor casing 29 and fit snugly within grooves in the exterior of the pump casing 86 and its cover 87.

As shown in the schematic view, Fig. 18, the key 97 has a short solid section at its right end and a reduced section that provides a shallow port 97a for the return of oil from the space 29b at the right of the piston to the space 29a at the left end of the casing 29. Key 98 has two axially spaced ports 98a, 98b, and key 99 has a centrally located port 99a. One or both of the keys 98, 99 are preferably adjustable on the casing 29 to vary the relationship between vehicle speed and governor displacement.

The ports of the keys are so positioned that the hydraulic pressure, and therefore the axial displacement of the governor casing 29, increases rapidly over certain ranges of governor speed and increases but slowly over other governor speed ranges. For normal operation and appropriate relationship between vehicle speed and the governor displacement under no load during acceleration may be substantially as shown by the solid line curve A of Fig. 19 and, during a slowing down of the vehicle, as indicated by the solid line curve A'. The dotted line curves B, B' respectively indicate the corresponding characteristics in actual operation when the governor displacement is opposed by the spring 34 of the parallel motion linkage. Curve A indicates that the governor displacement rises rapidly to about 50% its total value as the vehicle accelerates to about 5 miles per hour, increases slowly as the vehicle speed rises to about 10 miles per hour, then rises rapidly to approximately full displacement at a vehicle speed of about 15 miles per hour, and then increases slowly as the vehicle is accelerated to top speed. On slowing down, the no-load governor characteristic as shown by curve A' may be such that corresponding critical vehicle speeds are, in reverse order, about 10, 5 and 3 miles per hour. Since the stress of the spring 34 must be overcome by the governor, the critical speeds on acceleration may be about 7, 15 and 18 miles per hour, and, on slowing down, about 6, 4 and 2 miles per hour.

A governor characteristic of this type is obtained by so locating the right end of the port 98a of key 98 that it is cleared by the pump casing 86 when the governor casing reaches about 50% displacement. This condition opens a by-pass or relief passage around the pump casing 86, through port 98a of key 98, port 99a of key 99 and port 98b of key 98. Increasing governor speed effects the transfer of a larger volume of fluid from the casing chamber 29a to the right of the pump casing 86, but the hydraulic pressure at the right of the casing increases but slowly with the governor speed until the displacement of the governor casing 29 to the right diminishes the effective capacity of the by-pass ports as the outlet port 98b is throttled by the pump casing 86. The governor casing 29 then moves rapidly to the right with increasing governor speed until the right end of the pump casing opens the port 97a of the key 97. This port is of such size that it by-passes the maximum capacity of the pump, thus preventing a substantial rise in the effective hydraulic pressure as the vehicle speed is increased to its top value.

The governor shaft 85 is rotatably and slidably supported in a bearing bracket 100 and is driven through the coupling sleeve 101 that telescopes over the squared end 102 of the driving head 103 on the end of flexible shaft 104. Collar 105 is pinned to the shaft 85 and rotates within a ring 106 that has vertically extending lugs 107 engaged by the yoked end 108 of lever 109 that is pivoted on the bracket arm 110.

Flexible cable 111 extends from the end of lever 109 to the vehicle panel for a manual control of the gears that will be engaged at a given vehicle speed. The normal position of lever 109, as shown in Fig. 1, conditions the governor for a shift into second gear at a vehicle speed of about 5 miles per hour and a shift to high gear at about 15 miles per hour. Adjustment of lever 109 displaces the entire governor assembly axially and thereby provides a "step up-step down" control by altering the critical vehicle speeds at which the governor rocks the parallel motion linkage 20, 23—26 to release the latch member 37 for a shifting of the gears.

The method of operation of the described apparatus may be best understood by first considering the functions of certain parts of the system. The shifting of the gears is effected by the axial movement of cam 19 through the roller 17 and linkage 13—16 that displaces the upper end of the shifting link 10. The drive connection to the cam shaft 40 is controlled by both the clutch and the vehicle speed governor through the latch systems comprising strap 61 and the cam slide 62, and the latching member 37 and lug 35 of plate 26, respectively. Cam 19 is rotated only when, upon release of the clutch, the vehicle speed is appropriate for a drive through gears other than then engaged. The direction of axial movement of cam 19 is determined by the raised or lowered position of the cam pin 66, and this position is controlled by notched plate 75 that is adjusted by the T-lever 20 of the parallel motion linkage in accordance with the vehicle speed. The position into which the bell-crank lever 23, 24 is shifted by the vehicle speed governor determines the direction of lateral displacement of the shifting link 10, and thereby selects the "low-reverse" rail 2 or the "second-high" rail 3 for operation. It may here be noted that a progressive shifting through the several forward speed gears is not compulsory as the shift may be directly from low to high, or from high to low, when the clutch is released while driving in one of these gears at a speed appropriate for a drive at the other gear ratio.

The method of operation will be described in connection with Figs. 4a to 4f which, except for the illustration of springs 34a, 34b in place of the single spring 34 of Fig. 1, conform to the actual apparatus as modified to separate the cam-operated linkage system 13—16 from the parallel motion linkage 20, 23—26 that is controlled by the vehicle speed governor.

Figure 4A:
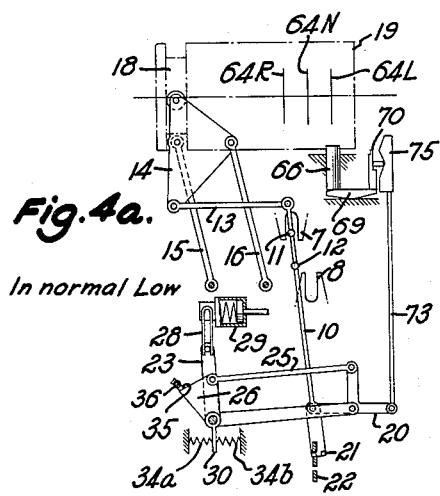
Figs. 4a to 4f are schematic views showing different adjustments of the linkage systems.
Figure 4B:
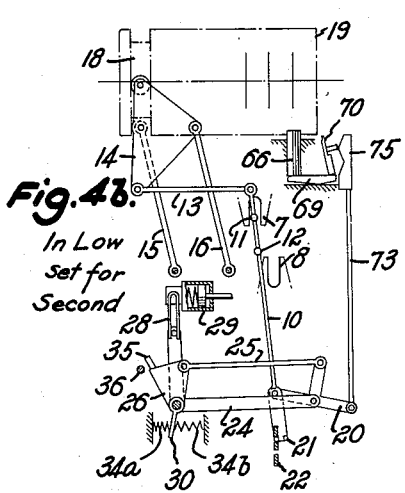
Figure 4C:
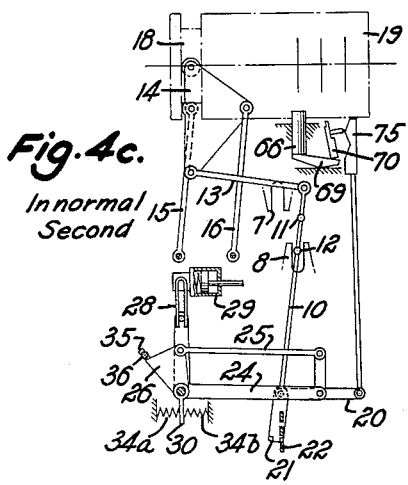

Assuming that the vehicle was stopped in the normal manner with the clutch disengaged, the several parts stand as shown in Fig. 4a. The drive is through the low speed gears when the engine is started and the clutch is engaged. The casing 29 of the vehicle speed governor moves to the right as the vehicle speed increases, thus rocking the lever 23, 24, clockwise, and thereby rocking the T-lever clockwise through a greater angle since the left end of the lever 20 is fixed by its pivotal connection to the link 10, the latter being locked by the location of its flange 21 in the upper notch of the rack 22, see Figs. 1 and 4b. Plate 26 is constrained by link 25 to move through the same angle as T-lever 20, and thereby compresses spring 34a and moves the lug 35 from vertical alinement with the pin 36 of the latch member 37. The spring 39, Fig. 2, is relatively weak and the latching member is no longer operative to hold the driving gear casing 48 in elevated position. Casing 48 is now held in raised position to prevent the engagement of the friction roller 46 with the flywheel 47 only by the strap 61 and cam slide 62 that is actuated by the clutch pedal control. The release of the clutch renders this second latch inoperative and the cam shaft 40 is then driven by the roller 46 and the associated gearing. The initial rotation of the cam 19 shifts it to the right to bring the cam groove 64N in engagement with the roller 67 on pin 66. Link 10 is thus shifted into neutral position with its flange 21 freed from the rack 22. This initial rotation of shaft 19 carries the stop pin 53, Fig. 5, past the end of the lever 52 which is thus freed to permit the linkage 50—52 to rock back to normal position which it does as the stress in spring 39 lifts the member 37. The stress in spring 34a rocks the plate 26 counterclockwise to return its lug 35 into position beneath the pin 36 of the latch member 37 and, through the link 25, rocks the T-lever 20 in the same direction to move the link 10 downwardly to position its flange 21 in line with the lower notch of the rack 22. Shift pin 12 of the link 10 is now engaged in the notch of the yoke 8 that is connected to the "second-high" shifting rail 3. Further rotation of the cam 19 brings its flange 72 into contact with the member 70, thereby depressing the same and lifting the pin 66. This position of pin 66 brings the cam groove 64R into operation and the cam 19 therefore moves to the right as its rotation is continued. The link 10 is therefore rocked to the right and the yoke 8 and rail 3 are shifted to the right to engage the second speed gears. Rotation of the cam 19 is arrested upon the completion of one revolution when the pin 53 rides beneath and lifts the lever 52 since, as stated above, the lug 35 is again positioned beneath the pin 36. The parts now stand in the positions shown in Fig. 4c. The vehicle drive is through the engaged second speed gears when the clutch is again engaged.

Figure 4D:
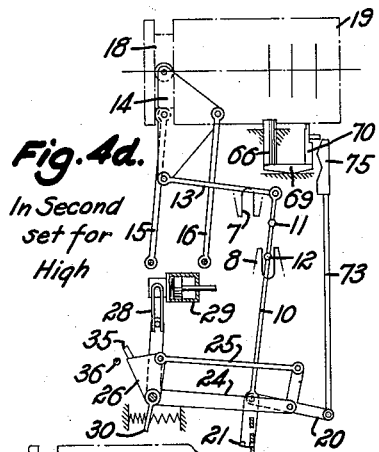
Figure 4E:
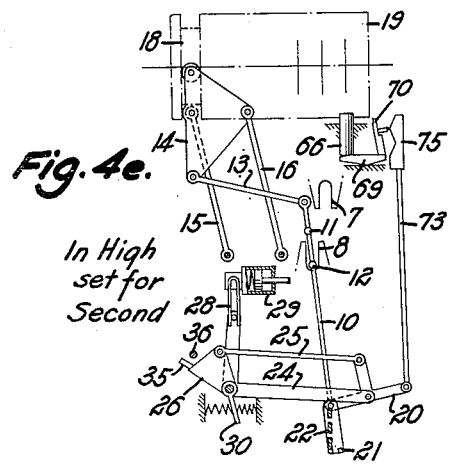
Figure 4F:
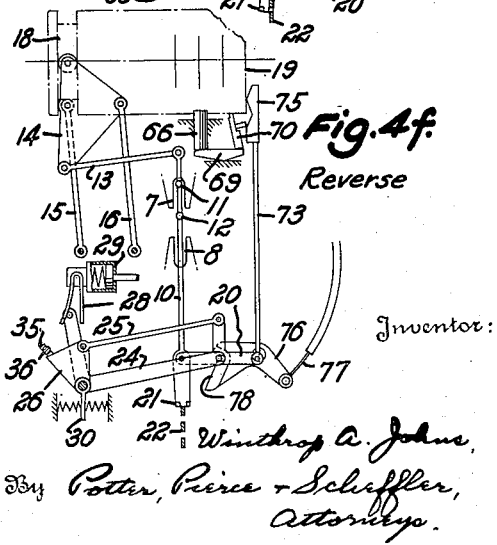

A further increase in vehicle speed produces a further clockwise motion of the bell-crank lever 23, 24, Fig. 4d. This rocks the T-lever 20 to shift rod 73 downward to position a valley of the plate 75 in line with pin 76 of member 70. This conditions the cam 19 for a shift to the left as the pin 66 will remain in lowered position when the cam flange 72 clears the member 70. The movement of lever 20 produces a clockwise motion of plate 26 that moves lug 35 from beneath the pin 36 of the latch member 37, thus rendering the latter inoperative. Release of the clutch displaces the cam slide 62 and the roller 46 drops into engagement with the flywheel 47. When shift link 10 reaches neutral position upon the initial rotation of the cam 19, the stress in the spring 34a is released by rocking the plate 26 counterclockwise to restore the lug 35 to its normal position beneath pin 36 of latch member 37. This movement of the parallel motion linkage also drops the shift link 10 downward to position its flange 21 below the lower projection of the rack 22. The continued rotation of cam 19 rocks the shift link 10 to the left to bring the high speed gears into operation.

The shift down to lower gears takes place in a similar manner. Lever 23, 24 is rocked counterclockwise by the governor sleeve 29 when the speed falls below that appropriate for high gear drive, Fig. 4e, and through the tilting of the T-lever 20 stresses the spring 34b and raises the rod 73 to position a crest of plate 75 in engagement with the pin 76 of member 70. Upon releasing the clutch the cam drive is brought into operation and the link 10 is shifted into neutral position and the stress in spring 34b is relieved by rocking the plate 26 clockwise and lifting the shift link 10 to place its pin 12 in the outer part of the notch in the notch in the yoke 8. Further rotation of the cam 19 shifts the link 10 and yoke 8 to the right to engage the second speed gears.

The step-down from second to low takes place in a similar manner when the governor casing 29 moves to the left to stress the spring 34b through the warping of the parallel motion linkage.

Reverse gear drive is obtained manually by pulling cable 77 to rock lever 76 clockwise to lift the T-lever 20 and position the flange 21 of link 10 above the upper projection of the rack 22, and to position a crest of the plate 75 opposite the member 70. This sets the cam 19 for a movement to the right, and the shift therefore is into reverse gear when the clutch is released and the cam 19 is rotated.

The operation of the power mechanism may be arrested to leave all gears disengaged, i. e. in neutral position, by manual adjustment of the pull cable 60 to rock the plate 59 and thereby depress the lever arm 55 into the path of the pin 54.

The adjustment of the lever 109 by the cable 111 enables the operator to select either a higher or a lower gear ratio than is "standard" for driving the vehicle at a particular speed. A "step-up" adjustment for starting in second gear is obtained by pulling on cable 111 to rock the lever 109 clockwise, thus shifting the governor assembly to the right of its normal rest position, i. e. into the position shown in Fig. 1. Similarly, a "step down" control for shifting back to second when the vehicle is operating on high gear is obtained by adjusting the lever 109 in the opposite direction to move the governor pump and piston assembly to the left. The governor casing also moves to the left as its position with respect to the piston is determined by the governor speed. This movement of the governor casing rocks the lever 23, 24 counterclockwise, as in Fig. 4e, to condition the system for a shift into second gear. The manually produced displacements of the relatively fixed elements of the governor are preferably equal to about 50% of the total governor displacement, whereby the operator's choice of standard, step-up or step-down operation does not alter the critical vehicle speeds at which a gear shifting operation may be effected but does determine the particular transmission gears that may be engaged at the critical vehicle speeds.

Another embodiment of a mechanically actuated gear shifting mechanism is shown in Figs. 20 to 32, inclusive. As in the described embodiment, the transmission gears are of conventional design and are identified generally by the reference character T but need not be described in detail. The customary slide rails 112, 113 are provided for controlling the reverse and low speed gears, and the second and high speed gears, respectively. The gear shifting mechanism of this invention affords a semi-automatic control of the actuation of the slide rails 112, 113 and thereby of the particular gear train that is brought into operation.

The manually actuated gear shift lever or equivalent manual control is replaced, in the apparatus of Figs. 20 to 32, by a power operated gear shift lever 114, see Fig. 27, that has a socket at its forward end to which a pin 115 with two flat sections 116, 117 is secured. The flat section 116 is the contact member for engagement in the notched projections of the slide rails 112, 113, and the flat section 117 extends through and is guided by the H-slot 118 in the cover plate 119 of the transmission box. The flat section 117 also extends through a longitudinal slot 120 in a slide plate 121, Fig. 28, that is secured to and movable transversely of the transmission box by a governor controlled sleeve 122 that is slidably mounted in bearings 123. Recesses 122' in the sleeve 122 cooperate with a spring pressed ball (not shown) in the lower bearing 123 as "indexing" notches which contribute to the accuracy of the adjustment of the sliding plate 121 to the appropriate one of its four operating positions. The end of the plate 121, at the rear of the sleeve 122, has a cam surface comprising longitudinally extending ridges 124 and 125 alternating with valleys 126 and 127.

As shown in Figs. 20 and 22, the notched hub 128 at the rear end of the lever 114 is slidably and pivotally supported on the longitudinally disposed rails 129 of a skeleton frame 130 that is secured to the cover plate 119 of the transmission gear box. A cam follower pin 131 extends axially through the hub 128 of the shift lever and is spring pressed into engagement with the cam surface of the sliding plate 121.

The upper end of the pin 131 engages a barrel or cylindrical cam 132 which is generally similar to the described cam 19 in that it has cam surfaces of different diameters for moving the follower 131, and thereby the shifting lever 114 in opposite directions. In the development view of the cam, Fig. 26, the broken lines indicate the alternate paths of travel of the cam follower 131, and the circles 131F, 131R indicate the respective positions of the follower 131 when the lever 114 has been shifted to engage the first or the high gear, or to engage the reverse or the second gear. The circles 131N indicate locations of the pin 131 when the shift lever 114 is in neutral position. The cam projections 133, 134 are of relatively large diameter and engage the follower 131 whether in low or elevated position to shift the lever 114 into neutral position upon the initial rotation of the cam 132. Cam projection 135 is of relatively small diameter and engages the pin 131 only when the latter is elevated by a cam ridge 124 or 125 to shift the lever 114 to the rear, and the cam projection 136 is of large diameter to move the follower 131 forwardly when it is in lowered position in contact with a valley 126 or 127 of the plate 121.

Inspection of Fig. 22 shows that the lateral movement of the forward end of the shifting lever 114 to engage the rail 112 or 113 is controlled by the transverse adjustment of the sliding plate 121, due to the engagement of the flat section 117 of pin 115 in the slot 120 of the plate 121. The direction of longitudinal movement of the shift lever is also determined by the lateral displacement of the plate 121 that has both a ridge and a valley at each side of its center line for determining the elevation of the follower pin 131. The extent and direction of motion of the slide plate 121 is determined by a governor that is driven as a function of the vehicle speed but the plate 121 is locked against movement, as in the previously described embodiment, so long as the flat section 117 of pin 115 is engaged in any of the H-slots 118 in the cover plate 119.

The power drive for the barrel cam 132 includes a low pitch worm 137 on the flywheel 47' and meshing gear 138 on a stub shaft which carries a bevel gear 139 that meshes with bevel gear 140 on a shaft 141. The rear end of the shaft 141 carries a gear 142 which meshes with a gear 143 on a shaft 144 that is journalled on the frame 130 in axial alinement with the shaft 145 that carries the barrel cam 132. One plate 146 of a friction clutch is secured to the shaft and the other plate 147 is carried by a sliding sleeve 148 that is splined to the cam shaft 145. The sleeve 148 has spaced radial flanges 149, 149', the latter having an arcuate cam 150, for cooperation with the several control members to determine the driving connection between the flywheel and the cam 132. A spring 151 surrounds the shaft 145 and tends to engage the friction clutch but, under normal running conditions, the clutch is held out by one or more of the control members.

One control mechanism is actuated by the car clutch pedal 152 which is shown in dotted line in Fig. 21 in released position. Arms 153 on a rock shaft 154 carry rollers 155 for engagement with the flange 149 of the sleeve 148, and an arm 156 that is positioned for engagement by the end of a flexible cable 157 when the clutch pedal is released; the arm 156 being then rocked towards the right, as seen in Fig. 21, to force crank arms 153 in the same direction to separate the plates of the friction clutch.

A second control is imposed upon the friction clutch by the crank arm 158 that is pivoted on the frame 130 for actuation by a flexible cable 159 that is controlled by a governor 160 that responds to the speed of the vehicle. The end of crank arm 158 is normally positioned in the path of the cam projection 150 and engages that cam projection to separate the clutch plates 146, 147 of the power drive to the cam 132. The crank arm may be rocked in opposite directions, by pushing or pulling the wire 159, to clear the cam projection 150. The governor includes a movable sleeve 161 that is displaced downwardly, as seen in Fig. 29, or to the left as viewed by the driver, upon an increase in the vehicle speed. The sleeve 122 of the sliding plate 121 is in axial alinement with the governor sleeve 161 and plunger 162 is telescoped within the sleeves, the plunger having predetermined positions with respect to the governor sleeve 161. A coil spring 163 within the sleeve has its ends fastened to the lower end of the plunger 162 and to an abutment 164 that is fixed to sleeve 122. An increase in the vehicle speed thus compresses the spring 163 and tends to move the sliding plate to the left as viewed by the driver, or downwardly as seen in Fig. 22, and a decrease in vehicle speed tensions the spring and tends to move the sliding plate in the opposite direction. A transverse movement of the plate 121 is possible, however, only when the shifting pin 115 of the lever 114 is alined with the transverse section of the H-slot in the plate 119.

The governor-actuated cable 159 is secured to the sleeve 122 and extends through a flexible sheath 159' that is secured, at its opposite ends, to the frame 130 and to the governor plunger 162, respectively. Relative movement of the plunger 162 and sleeve 122 thus produces a corresponding relative movement of the flexible sheath 159' and the wire 159 for actuating the crank arm 158. A significant change in vehicle speed results in a movement of the plunger 162 but the sleeve 122 cannot move until the guide pin 115 of the shifting lever 114 is alined with the crossbar of the H-slot 118. Downward motion of plunger 162 on increasing vehicle speed thus telescopes the end of the sheath 159' over the wire 159 and produces, in effect, a thrust on the wire 159 that rocks the crank arm 158 clockwise, Fig. 21. Conversely, upward motion of plunger 162 on a decrease in vehicle speed withdraws the adjacent end of sheath 159' from wire 159 and results in a pull on the wire at its connection to the crank arm 158, thus rocking the crank arm counterclockwise. These motions of the crank arm 158 to clear the cam projection 150 do not result in an immediate engagement of the clutch plates 146, 147 since, as stated above, the wire 157 engages the arm 156 to shift the flange 149 to the right, Fig. 21, so long as the vehicle clutch is engaged.

A third control is imposed upon the friction clutch by a lever or crank arm 165 that is actuated by a manually controlled flexible cable 166. The lever 165 is positioned on the frame 130 for engagement with the cam 150 to interrupt the cam rotation when the follower 131 has shifted the lever 114 into neutral position, i. e. when the pin 131 occupies the lower position 131N, Fig. 26, with respect to the cam 132. The mechanism for actuating the cable 166 will be described later.

As previously stated, the plunger 162 has certain predetermined positions with respect to the governor sleeve 161, and this adjustment permits a control of the vehicle speeds at which the crank arm 158 is moved from the path of cam 150 by the displacement of sleeve 122 and cable 159. A manual control of the effect of the governor 160 upon the gear shift mechanism is obtained through a cable 167 secured to the plunger 162 and extending through a sheath 168 that is anchored in a block 169 fixed to the sleeve 161. The other end of the sheath 168 is secured to the casing 170 and the cable 167 is secured to a control handle 171 that is slidably and rotatably mounted in the casing 170. The effective length of the governor-actuated sleeve 161 and plunger 162 is thus determined by the longitudinal adjustment of the handle 171 with respect to the casing 170.

The handle 171 is normally retained in the position shown in Fig. 29 by the engagement of a stud 170a that projects inwardly from the casing 170 into the cross bar of an H-shaped groove in the handle 171. The forward and rearward sections 172, 173 of the groove which aline with the stud 170a on clockwise rotation of the handle 171 permit movement of the handle axially of the sleeve 170 to increase or to decrease, respectively, the effective length of the governor actuated mechanism, thereby to increase or decrease the stress of the spring for a given positioning of the sleeve 122 and its sliding plate 121. The ends of groove sections 172, 173 turn inwardly to form locking recesses for retaining the handle 171 in the position to which it is manually adjusted, the locking action being provided by the flexible wire or cable 167 that is subjected to torsional stress when the handle 171 is turned from the position shown in Fig. 29. Turning handle 171 clockwise, as viewed by the operator, and pulling out the handle, provides a "step-up" which permits a shift into second or high speed gears at vehicle speeds appropriate, respectively, for a drive through the first or the second speed gears under normal operating conditions. Conversely, a clockwise movement and pushing in of the handle 171 results in a "step-down" operation which permits a drive of the vehicle through a gear train of lower speed ratio, at a given vehicle speed, than is appropriate under normal conditions.

The forward and rearward sections 174, 175 of the groove which aline with the stud 172 on a counterclockwise rotation of the handle 171 provide a shift of the gears into neutral or reverse, respectively. The headed end of the neutral control wire 166 extends into the casing 170 in position for engagement in a slotted lug 176 on the inner end of handle 171 when the latter is turned counterclockwise. A pull on handle 171 draws cable 166 to rock the lever 165 into position to engage cam surface 150 of the clutch plate 147 to disengage the clutch after about one-quarter revolution.

The shift into reverse requires a displacement of the shifting plate 121 from its normal position corresponding to a zero or low speed drive of the governor from the vehicle. A latch member 177 pivoted on the cover 119 is normally held in engagement with a stop 178 on the plunger 162 by a spring 179 that is secured to the sheath 180 through which the flexible cable or wire 181 extends to the casing 170 for engagement by the handle 171 when the latter is pushed forward after a counterclockwise movement. The forward movement of the wire 181 releases the latch 177, and the accompanying movement of wire 167 telescopes the plunger 162 into the sleeve 161.

The "neutral" control wire is moved forwardly when the handle 171 is set for reverse, but this motion merely turns the lever 165 away from the cam 150. Recesses 182 are formed in the end of the handle 171 to receive the ends of control wires 166 and 181 when the handle 171 is turned clockwise and pushed in.

The method of operation of this form of the invention is as follows. The parts are shown in Figs. 21 and 22 in "neutral" position and with the clutch pedal depressed for starting the motor. The car may have been stopped with the gears in this position by a manual actuation of the handle 171 to position the "neutral" lever 165 in the path of the cam projection 150, the handle 171 having been thereafter adjusted, as shown in Fig. 29, for normal operation. The clutch plates 146 and 147 are in engagement and the cam 132 will be rotated as soon as the engine is started. The guide pin 115 and the slot 120 of the shifting plate 121 are in line with the low speed section of the H-slot 118, and the pin 131 rests in the valley 126 of the slide plate 121. The rotation of the cam 132 is arrested when the cam projection 150 of flange 149' engages the crank arm 158, i. e. when the lever 114 has moved forward due to the engagement of the pin 131 with the larger diameter cam surface 136 of the cam 132. The clutch pedal 152 is then released for a drive of the vehicle through the low speed gear. When the vehicle speed rises to a value appropriate for a drive through the second speed gears, the governor 160 has moved the plunger 162 downwardly, thus compressing the spring 163 and producing a thrust on the wire 159 (due to the downward motion of the flexible sheath 159') and the crank arm 158 is thereby moved out of the path of the cam projection 150. Upon depressing the clutch pedal 152, wire 157 is moved from the end of the crank arm 156 and the spring 151 expands to engage the friction clutch 146, 147. The cam 132 rotates as soon as the friction clutch is engaged and the first effect of such rotation is to shift the pin 131 to the right, Figs. 22 and 26, to carry the guide pin 116 of the shift lever 114 into the cross bar of the H-slot 118. The compression in spring 163 shifts the slide plate 121 downwardly to bring the section 117 of pin 115 of the shift lever 114 and the slot 120 of the slide plate 121 into line with the leg of the H-slot 118 corresponding to an engagement of the second speed gears. This motion of slide plate 121 brings the ridge 125 beneath the follower pin 131 and the continued rotation of cam 132 brings the small diameter cam projection 135 into engagement with the pin 131 to move the latter toward the right, thus shifting the lever 114 to the right, Fig. 22, for a rearward shift of the slide rail 113 by the flat section 116 of the pin 115, Fig. 20. The downward motion of the sleeve 122 resulted in a pull on the wire 159 which rocked the crank arm 158 counterclockwise into the path of movement of the cam projection 150. The cam projection engages the crank arm 158 to shift the clutch plate 147 into disengaged position thus stopping the rotation of cam 132 when the follower pin 131 is in the position 131R, Fig. 26.

The shift from second speed to high speed is effected in a similar manner after the car is accelerated to a speed appropriate for a drive in high gear. The increased speed of the governor 160 displaces the plunger 162 and thereby exerts a push on the wire 159 to release the crank arm 158 from the cam projection 150. The cam 132 is connected to its driving mechanism when the clutch pedal 152 is depressed and, as before, the initial rotation of the cam 132 displaces the follower pin 131 to position the shift lever pin 115 in the cross bar of the H-slot. The compression in the spring 163 is then relieved by a further downward motion of sleeve 122 and slide plate 121 to aline the pin 115 with the section of H-slot 118 corresponding to high gear. This motion of the shift plate brings the cam valley 127 beneath the follower pin 131, thus permitting pin 131 to drop to clear the cam projection 135 of cam 132. Further rotation of cam 132 brings cam projection 136 into engagement with pin 131 and shifts the latter forwardly of the car, Fig. 22, to move the lever 114, its pin 115 and slide rail 113 forward. The sliding motion of plate 121 exerted a pull on wire 159 to rock the crank arm 158 into the path of cam projection 150, thereby stopping the rotation of the cam 132 at the end of one complete revolution.

The shift down is effected in a similar manner when a decrease in the vehicle speed produces a tension in the spring 163. A decrease in the governor speed results in an upward movement of the plunger 162, Fig. 29, which tensions the spring 163 and displaces the sheath 159' of wire 159 to release the crank arm 158 from the cam projection 150. Upon depressing the vehicle clutch pedal 152, the friction clutch 146, 147 is engaged to rotate the cam 132. The tension in spring 163 is relieved by the displacement of slide plate 121 as soon as the pin 115 reaches the cross bar of the H-slot 118. If the decrease in vehicle speed is such that a drive in second gear is appropriate, the tension in spring 163 will be relieved when the pin 115 alines with the second gear section of the H-slot, and the shift lever 114 will be moved rearwardly by the cam 132 and pin 131 since the pin 131 is seated on the cam ridge 125. If the decrease in vehicle speed is so great that the car should be operated in low gear, the tension in spring 163 will not be relieved until the pin 115 moves into alinement with the low speed section of the H-slot 118. The follower pin 131 now rests in the cam valley 126 and this lowered position of the pin 131 results in a forward movement of the shift lever 114 to engage the low speed gears.

The shift into reverse can be made by turning the handle 171 counterclockwise to bring the section 175 of the H-groove into alinement with the pin 172, and then pushing the handle 171 inwardly. This inward movement of the handle produces a thrust on wire 181 to trip the latch 177 and a thrust on wire 167 to telescope the plunger 162 within the sleeve 161. This displacement of plunger 162 tensions the spring 163 and, through the movement of the sheath 159', exerts a pull on the wire 159 to rock the crank arm 158. The initial rotation of cam 132 upon depressing the clutch pedal 152 shifts the follower pin 131 into neutral position and the tension in spring 163 is relieved by a displacement of the slide plate 121 upwardly, as viewed in Fig. 22. The pin 115 of the shift lever 114 is now alined with the reverse gear section of the H-slot 118 and the follower pin 131 rests on the cam ridge 124. The further rotation of the cam 132 therefore shifts the pin 131 and lever 114 to the rear.

As previously described, the effective length of the sleeve 161 and plunger 162 of the governor mechanism may be controlled manually to effect a step-up or a step-down of the gear engagements for a particular vehicle speed. Clockwise rotation of the manual control handle 171 permits an inward or outward movement of the handle to decrease or alternatively to increase the effective length of the sleeve 161-plunger 162, thus decreasing or increasing the compressive stress in the spring 163 for any given position of the governor sleeve 161. A decrease in the effective length of the governor actuated mechanism thus results in a "step-down" action by which the first and second speed gears are engaged at vehicle speeds appropriate, under normal operating conditions, for an engagement of the second speed or high speed gears, respectively. Similarly, the "step-up" action obtained by increasing the effective length of the governor-actuated mechanism results in an engagement of the second and the high speed gears at vehicle speeds which, at normal operating conditions, are appropriate for engagement of the first speed or second speed gears, respectively.

It is to be noted that the inherent operating characteristics of the governor 160 are not affected by the manual adjustment of the effective length of the telescoped members 161, 162 when, as is preferred, the manually produced changes in the effective length of the telescoped members are equal to the displacement of sleeve 122 and sliding plate 121 for a shift between adjacent gear trains. If the critical vehicle speeds at which the displacement of the governor sleeve 161 and plunger 162 releases the crank arm 158 from the cam projection 150 are, under normal operating conditions with handle 171 in the position shown in Fig. 29, say 5 and 10 miles per hour, the adjustment of handle 171 for step-up operation or step-down operation does not affect these critical vehicle speeds at which crank arm 158 is freed from the cam projection 150 but, by changing the stress in the spring 163, determines the gear train that may be brought into operation when the critical speeds are reached.

The gear shifting mechanism of Figs. 33 to 37 is associated with transmission gears T that are of conventional design and selectively engaged in the usual manner by slide rails 201, 202 that carry forks 203, 204, respectively, for displacing the movable gear elements. Slide rail 201 controls the reverse and low speed gears and slide rail 202 controls the second and high speed gears. The actuating member of the mechanism is a shift link 205 terminating in a vertically disposed cross bar 206 having an upper end for engagement in the slotted upper ends of the forks 203, 204 and a lower end that projects into an H-slot 207 in a guide plate 208. The other end of the link 205 is pivoted to the rod 209 of a piston 210 in a cylinder 211 that is mounted on the rear end of the gear box. The pressure or suction fluid connections to the cylinder for displacing the piston, and thereby one of the shift rails, will be described later.

The shift link 205 extends through the upper forked end of a yoke 212 that is slidable on the bar end 213 of an arm 214 which is the movable member of a governor 215. The governor comprises a collar 216 fixed to a shaft 217 carrying a gear 218 in mesh with a gear 219 on the driven shaft 220 of the transmission T, weights 221 on links connecting the collar 216 to the arm 214, and a spring 222 that tends to displace the arm 214 from the collar.

A pair of coil springs 223, 224 are arranged about the bar 213 between the depending ends of the yoke 212, the springs seating between a collar 225 that is secured to the bar 213 by a pin 226 and the cups 227 that are slidable on the bar 213. The spring 223 cooperates with the governor spring 222 in tending to shift the bar to the right, Fig. 34, and the spring 224 opposes this motion.

The outer end of the square bar 213 extends into a valve casing 228 and is provided with three pairs of oblique grooves 229, 230 and 229', respectively, Fig. 36, for controlling the flow of a pressure fluid, preferably air, to the opposite ends of the cylinder 211. Pipes 231, 232 extend from the valve casing ports 233, 234, to the front and the rear ends, respectively, of the power cylinder 211, and a port 235 at the bottom of the valve casing opens to atmosphere. A port 236 at the top of the casing is connected by a pipe 237 to a slide valve 238 that is coupled to the vehicle clutch pedal 239 and moved thereby to open position when the pedal is depressed, as shown in Fig. 37; and a pipe 240 extends from the opposite side of the slide valve casing to the inlet manifold 241 of the engine. When bar 213 is in its intermediate position, as shown in Fig. 37, the grooves 230 are in line with the ports of the valve casing, thus connecting the rear end of the cylinder 211 to the engine manifold and the forward end of the cylinder to atmosphere. Displacement of the valve bar 213 into its end positions brings the grooves 229 or 229' respectively, into line with the valve ports to connect the suction line 237 to the front end of cylinder 211 through the port 233 and pipe 231, and open the rear end of the cylinder to atmosphere through the pipe 232 and port 235.

The grooves 229 and 229' thus control the forward displacement of piston 210 to effect the shift into low speed and high speed, respectively, and grooves 230 control the rearward displacement of the piston 210 for the shift into second and reverse speeds. The governor 215 functions, as will be described, to displace the valve bar 213 into its intermediate position for the shift into second speed, and a manually controlled lever 242 on the bar 213 conditions the apparatus for a shift into reverse gear. The lever 242 is normally held in the position shown in Figs. 33 and 34 by a spring 243 and may be displaced by a pull wire 244 that extends to a control member (not shown) on the instrument panel, to force the other end of the lever 242 against the yoke 212, thereby shifting the bar 213 to the left, Fig. 34.

If the cross bar 206 is in the "neutral" section of H-slot 207 when the reverse lever 242 is actuated, the shift link 205 moves into the slot of fork 203 and, if another gear is engaged when lever 242 is rocked, the spring 223 is compressed to effect this displacement of the shift link as soon as the cross bar 206 reaches neutral position.

Assuming that the vehicle is stationary, the governor spring 222 forces the bar 213 to the right to aline the grooves 229 with the valve casing ports. This position of the valve connects the suction pipe 237 to the pipe 231 that leads to the front end of cylinder 211 and, upon starting the engine, the piston 210 moves forward to displace shift rail 201 to engage the low speed gears. As the vehicle is accelerated, the governor displaces the arm 214 and bar 213 to the left, Fig. 34, to aline the grooves 230 of the bar 213 with the valve casing ports (as shown in Fig. 37), and to compress the spring 223, thus tending to displace the shift link 205 to the left. The engagement of the cross bar in the H-slot of plate 208 prevents this movement until, upon depressing the clutch pedal 239, the valve 238 is opened to connect the pipe 237 to the inlet manifold. The accelerator pedal is of course released when the clutch pedal is depressed, and the resultant pressure reduction in the engine manifold effects a shift of the piston 210 to move the cross bar 206 of the shift link rearwardly into the cross bar of the H-slot of the guide plate 208. The stress in the spring 223 is relieved, when the cross bar 206 reaches this neutral position, by shifting the yoke 212 to the left, Fig. 34, thus moving the cross bar 206 into the slot of the fork 204 of the slide rail 202. The direction in which the slide rail 202 is moved depends upon the vehicle speed when the clutch pedal is released to open the slide valve 238. If the vehicle speed is appropriate for operation in second speed, the stress in spring 223 is fully relieved when the yoke 212 is shifted to aline the grooves 230 of the valve bar with the valve casing ports, Fig. 37, and the piston 210 is therefore moved rearwardly to engage the second speed gears. Upon a further increase of the vehicle speed, the governor arm 214 and its bar 213 are displaced towards the left, Fig. 34, thus alining the grooves 229' of the valve bar with the valve casing ports and carrying the cross bar 206 more deeply into the fork 204. The release of the vehicle clutch opens the suction line valve 238 and the pressure is reduced at the forward face of piston 210 to move the cross bar 206 of the shift link 205 forward into neutral and then into high speed position.

The described progressive engagement of the gears takes place when the clutch is released when the vehicle speed is appropriate for a drive in second speed and released again when the vehicle speed is appropriate for a drive in high speed. If the vehicle is accelerated in the low speed gear to a value appropriate for a drive through the high speed gears, the shift is directly into high in the following manner. The displacement of the governor arm 214 is limited by yoke 212 until the clutch pedal is released, to a distance equal to the spacing between the valve bar grooves 229 and 230. The release of the clutch and accompanying opening of the suction line valve 238 therefore result in a rearward movement of piston 210 which moves the shift link 205 and its cross bar 206 back to neutral position. The compression stress previously established in spring 223 would be relieved by a shift of the yoke 212 to carry the cross bar 206 into the outer portion of the fork 204 but, if the vehicle speed is appropriate for a drive in high speed, the governor 215 shifts the arm 214 and bar 213 further to the left, Fig. 34, as soon as the cross bar 206 reaches neutral position, thus displacing spring 223 and its abutment 225 further to the left. This follow-up action of the governor arm 214 therefore results in an increased displacement of the yoke 212 to relieve the stress in the spring 223 and in the movement of the slide bar 213 to carry the grooves 229' into line with the valve casing ports. The displacement of the piston 210 is therefore to the forward end of the cylinder 211, and the shift bar 205 is moved forwardly to shift the rail 202 into its high speed drive position.

The shift down to lower speed gears is effected in a similar manner, the spring 224 being stressed as the governor speed decreases, to displace the valve bar 213 to the right. The apparatus is set for a shift into reverse gear by pulling on the wire 244 to rock the lever 242 to force the yoke 212 and the bar 213 to the right, Fig. 34, to position the grooves 230 of bar 213 in line with the valve ports.

Claims specific to the embodiment shown in Figs. 1 to 19, inclusive, are presented in my copending application, Ser. No. 287,794, filed August 1, 1939; and claims specific to the embodiment shown in Figs. 33 to 37, inclusive, are presented in my copending application, Ser. No. 288,038, filed August 2, 1939.

The described embodiments are illustrative of the invention and indicate that there is wide latitude in the design and arrangement of the several parts of the gear shifting apparatus. It is to be understood that the invention is not limited to the constructions herein shown and described, and that various modifications fall within the spirit of my invention as set forth in the following claims.

I claim:

1. The combination with a primary driving element, a driving shaft, a clutch for connecting said driving shaft to said driving element, and a driven shaft, of transmission mechanism for coupling said driven shaft to said driving shaft; said transmission mechanism including a plurality of coupling means alternatively operable to provide different speed ratios of said shafts, a pair of slide rails each movable axially in opposite directions from a neutral position to render operable certain of said coupling means, a control member movable to a plurality of predetermined positions, to select and to move in the desired direction one or the other of said slide rails, thereby to render operable a particular one of said coupling means, power means for moving said control member to each of said predetermined positions, latch means normally rendering said power means inoperative to effect movement of said control member, a governor responsive to the speed of said driven shaft for determining the position to which said control member will next be moved by said power means, and unlatching means including a release member operable upon an uncoupling movement of said clutch for releasing said latch means, and a second release member operable by said governor, said release members being connected mechanically in parallel to said latch means, whereby both of said release members must be actuated to render said power means operable to move said control member into a new position as determined by said governor.

2. A semi-automatic gear shifting device for motor-driven, clutch-controlled vehicles of the type in which power means is operable by the vehicle motor to effect a shift in the transmission gears of the vehicle, a normally inoperative coupling means is provided for connecting said power means to the vehicle motor, and a governor responsive to the vehicle speed controls means for determining the gear shift to be made when said power means is energized, characterized by the fact that said coupling means includes two latch members each operable individually to prevent said coupling means from coupling said power means to the vehicle motor, means controlled by said governor for releasing one of said latch members, and means controlled by the vehicle clutch for releasing the other latch member.

3. In a semi-automatic gear shift mechanism for vehicles having a driving shaft and a driven shaft adapted to be coupled through one of a plurality of sets of transmission gears, the combination with a member movable to a plurality of positions to select the set of transmission gears that is to be rendered operative, a governor for actuating said movable member to its several positions, said governor including a pair of members movable with respect to each other in accordance with the vehicle speed, means manually operable to adjust one of said governor members to a plurality of positions, and spring means coupling one of said governor members to said movable member for actuating the same, whereby the vehicle speed at which said governor actuates said movable member to a particular position is determined by the manual adjustment of one of said governor members.

4. In a gear shift mechanism, a driving and a driven shaft, a plurality of separately operable transmission trains for coupling said shafts, power mechanism for rendering said gear trains operative, means displaceable to select the transmission train to be rendered operative by said power mechanism, a governor including a member movable in response to the speed of the vehicle, and means coupling said selecting means to said governor for actuation thereby; said coupling means including a second member movable with respect to said first member, spring means connecting said second member to said selecting means, and manually operable means for adjusting said second member with respect to the governor-movable member, whereby the particular vehicle speed at which said governor displaces said selecting means to select a particular transmission train for actuation is determined by the setting of the manually adjustable means.

5. In a semi-automatic gear shift mechanism for vehicles having a driving shaft and a driven shaft adapted to be coupled through one of a plurality of sets of transmission gears, the combination with a movable member displaceable to select the set of transmission gears to be rendered operative, a governor responsive to vehicle speed for actuating the member, said governor including a pair of telescoped elements of which one is movable in accordance with vehicle speed, manually operable means for adjusting the effective length of said telescoped elements, and yielding means coupling the second of the telescoped elements to said member.

6. A gear shifting device for vehicles including a gear transmission mechanism having shiftable gears; gear shifting rails movable forwards and rearward of a neutral position; a finger selectively engageable with said rails, a governor responsive to the speed of the vehicle; cam means for operating the finger having a cam for shifting the finger forwardly, a cam for shifting the finger rearwardly, a cam for shifting the finger to the neutral position; and means operable by the governor for selectively engaging the finger with said rails when the finger is in said neutral position.

7. A semi-automatic gear shifting device for motor-driven, clutch-controlled vehicles of the type in which power means is operable by the vehicle motor to effect a shift in the transmission gears of the vehicle, a normally inoperative coupling means is provided for connecting said power means to the vehicle motor, and a governor responsive to the vehicle speed controls means for determining the gear shift to be made when said power means is energized, characterized by the fact that said power means includes a barrel cam having cam surfaces of different diameters thereon, and means including a follower engageable with said cam surfaces for effecting a shift in the transmission gears; and said shift-determining means includes mechanism for selectively adjusting said follower to engage one or the other of said different diameter surfaces.

8. In a device of the type stated, a barrel cam having alternatively operable cam surfaces of different diameters projecting therefrom and diverging from each other axially of the cam, a follower for engagement with the edges of said cam surfaces, and means for adjusting said follower towards and away from the axis of said barrel cam, thereby to determine the cam surface engageable by said follower.

9. In a device of the type stated, a barrel cam as claimed in claim 8 in which a pair of said cam surfaces of different diameters have edges arranged respectively at opposite inclinations to the axis of the barrel cam.

10. In a device of the type stated, a barrel cam as claimed in claim 8 in which a pair of said cam surfaces of different diameters have edges arranged respectively at opposite inclinations to the axis of the barrel cam, and a pair of additional cam surfaces of a diameter substantially equal to the maximum diameter of the first pair of cam surfaces, the second pair of cam surfaces having edges in alinement longitudinally of the barrel cam and oppositely directed to carry the follower substantially to the longitudinal center of the barrel cam.

11. A gear shifting device for vehicles including a gear transmission mechanism operable into a plurality of shifts; a laterally shiftable plate longitudinally slotted at one end and provided with longitudinally extending crests and valleys at its other end; a lever mounted for lengthwise and transverse movements relatively to the shiftable plate, having a gear shifting finger at one end located in the longitudinal slot of the shiftable plate and carrying at its other end a vertically movable pin exposed at both ends, one of which rides the crests and valleys of the shiftable plate; moving cam-means comprising high and low cams engageable with the other end of said pin and which, depending on the relation of the crest and valley portion of the shiftable plate to the pin, operate the lever and its gear shifting finger into forward, rear and neutral gear shift positions; a stationary slotted plate in connection with the transmission having a transverse neutral slot and longitudinal slots extending forwardly and rearwardly therefrom which slots receive and guide the gear shifting finger; and a governor responsive to the speed of the vehicle operatively related to the shiftable plate to shift same laterally when the finger is in the aforesaid transverse neutral slot.

12. A gear shifting device for vehicles including a gear transmission mechanism operable into a plurality of shifts; a laterally shiftable plate longitudinally slotted at one end and provided with longitudinally extending crests and valleys at its other end; a lever mounted for lengthwise and transverse movements relatively to the shiftable plate, having a gear shifting finger at one end located in the longitudinal slot of the shiftable plate and carrying at its other end a vertically movable pin exposed at both ends, one of which rides the crests and valleys of the shiftable plate; moving cam-means comprising high and low cams engageable with the other end of said pin and which, depending on the relation of the crest and valley portion of the lever to the pin, operate the shiftable plate and its gear shifting finger into forward, rear and neutral gear shift positions; a stationary slotted plate in connection with the transmission having a transverse neutral slot and longitudinal slots extending forwardly and rearwardly therefrom which slots receive and guide the gear shifting finger; a governor responsive to the speed of the vehicle; a resilient connection between the governor and the lateral shiftable plate for effecting the lateral shifting thereof when the finger is in the transverse neutral slot; a main clutch for controlling the power transmission to the vehicle, a subsidiary clutch for controlling power transmission to the cam-means, the two clutches being interrelated so that throwing out of the main clutch permits the throwing in of the subsidiary clutch; and stop means associated with the cam-means and operated from said resilient connection for imposing limits upon the motion of the cam-means.

13. The gear shifting device of claim 11 further characterized by the said governor and shiftable plate being operatively related as aforesaid by a connection which includes a spring.

14. The gear shifting device of claim 11 further characterized by the said governor and shiftable plate being operatively related as aforesaid by a connection which includes a spring; and manual means for adjusting the length of said connection.

15. The gear shifting device of claim 11 further characterized by there being a main clutch for controlling the power transmission to the vehicle and a subsidiary clutch for controlling the power of transmission to the cam means, the two clutches being interrelated so that throwing out the main clutch permits the throwing in of the subsidiary clutch.

16. A gear shifting device for vehicles including a gear transmission mechanism operable into a plurality of shifts; a laterally shiftable plate provided with longitudinal extending crests and valleys, a lever mounted for lengthwise and transverse movements relatively to the shiftable plate having a gear shifting finger and carrying a vertically movable pin exposed at both ends, one of which rides the crests and valleys of the shiftable plate, moving cam-means comprising high and low cams engageable with the other end of said pin and which, depending on the relation of the crest and valley portion of the shiftable plate to the pin, operate the lever and its gear shifting finger into forward, rear and neutral gear shift position; a stationary slotted plate in connection with the transmission having a transverse neutral slot and longitudinal slots extending forwardly and rearwardly therefrom, which slots receive and guide the gear shifting finger; a governor responsive to the speed of the vehicle; and an operative connection which includes a spring between the governor and the shiftable plate to shift the plate laterally when the finger is in the aforesaid transverse neutral slot.

17. The gear shifting device of claim 16 further characterized by manual means for adjusting the length of said connection.

18. A gear shifting device for vehicles including a gear transmission mechanism operable into a plurality of forward speed shifts and a reverse shift; a laterally shiftable plate provided with longitudinally extending crests and valleys; a lever mounted for lengthwise and transverse movements relatively to the shiftable plate having a gear shifting finger and carrying a vertically movable pin exposed at both ends, one of which rides the crests and valleys of the shiftable plate; moving cam-means comprising high and low cams engageable with the other end of said pin and which, depending on the relation of the crest and valley portion of the shiftable plate to the pin operate the lever and its gear shifting finger into forward, rear and neutral gear shift positions; a stationary slotted plate in connection with the transmission having a transverse neutral slot and longitudinal slots extending forwardly and rearwardly therefrom which slots receive and guide the gear shifting finger; a governor responsive to the speed of the vehicle; and operative connection which includes a spring between the governor and the shiftable plate to shift the plate laterally when the finger is in the aforesaid transverse neutral slot; means associated with said operative connection which normally prevents the governor from moving the shiftable plate when the governor is operating below first speed; and manually operable means for releasing the last mentioned means and for changing the length of the aforesaid operative connection to effect the reverse speed shift.

WINTHROP A. JOHNS.